(12) United States Patent
Abevi et al.

(10) Patent No.: US 9,267,587 B2
(45) Date of Patent: Feb. 23, 2016

(54) ROLLER SCREW

(71) Applicants: Folly Abevi, Chambéry (FR); Eric Allegri, Montmélian (FR)

(72) Inventors: Folly Abevi, Chambéry (FR); Eric Allegri, Montmélian (FR)

(73) Assignee: AKTIEBOLAGET SKF, Gothenburg (SE)

( * ) Notice: Subject to any disclaimer, the term of this patent is extended or adjusted under 35 U.S.C. 154(b) by 4 days.

(21) Appl. No.: 14/225,198

(22) Filed: Mar. 25, 2014

(65) Prior Publication Data

US 2015/0276030 A1    Oct. 1, 2015

(51) Int. Cl.
*F16H 25/22* (2006.01)

(52) U.S. Cl.
CPC .................................. *F16H 25/2252* (2013.01)

(58) Field of Classification Search
CPC .................... F16H 25/2252; F16H 2025/2481; F16H 2025/249
See application file for complete search history.

(56) References Cited

U.S. PATENT DOCUMENTS

| | | | |
|---|---|---|---|
| 3,726,151 A | 4/1973 | Lemor | |
| 4,037,893 A * | 7/1977 | Perrin | 384/550 |
| 4,470,646 A * | 9/1984 | Fuchsluger | 384/550 |
| 2010/0269616 A1* | 10/2010 | Merlet et al. | 74/424.92 |
| 2013/0152716 A1* | 6/2013 | Buvril et al. | 74/89.23 |

FOREIGN PATENT DOCUMENTS

| | | |
|---|---|---|
| DE | 9214062 U1 | 12/1992 |
| DE | 19919566 A1 | 11/2000 |
| DE | 10249762 A1 | 5/2004 |
| EP | 0049788 A2 | 4/1982 |
| FR | 83127 E | 6/1964 |
| JP | 2009103291 A | 5/2009 |
| JP | 2009121562 A | 6/2009 |

* cited by examiner

*Primary Examiner* — Sherry Estremsky
(74) *Attorney, Agent, or Firm* — Bryan Peckjian; SKF USA Inc. Patent Dept.

(57) ABSTRACT

A roller screw mechanism provided with a screw having an external thread, a nut surrounding and coaxial with the screw, the nut including an internal thread, two gear wheels mounted in a non-threaded part of the nut, each gear wheel providing a first set of teeth having a plurality of internal teeth, and a plurality of rollers radially located between the screw and the nut, each roller having an external thread designed to engage the external and internal threads of the screw and the nut, and axially at each end a first set of teeth having a plurality of gear teeth designed to engage with the internal gear teeth of the gear wheels. The outer diameter of the gear teeth of each roller is less or equal to the diameter of the thread root of the external thread of the roller.

7 Claims, 9 Drawing Sheets

ROLLER SCREW

CROSS-REFERENCE TO RELATED APPLICATIONS

This application claims priority to European Patent Application No. EP13305361 filed Mar. 25, 2014.

FIELD OF THE INVENTION

The present invention relates to the field of roller screw mechanisms for transforming a rotary movement into a linear translation movement, and vice versa.

BACKGROUND OF THE INVENTION

Such a mechanism is provided with a screw having an external thread, with a nut arranged around the screw and having an internal thread, and with a plurality of longitudinal rollers engaging the external and internal threads of the screw and of the nut. Compared to a ball screw mechanism, the main advantage of a roller screw mechanism is increased admissible load capacities.

One type of roller screw mechanism includes rollers having an external thread engaging the external and internal threads of the screw and of the nut. The threads of the rollers and the thread of the nut have helix angles that are identical to each other and different to that of the thread of the screw such that, when the screw rotates in relation to the nut, the rollers rotate on themselves and roll about the screw without moving axially inside the nut. The rollers are rotationally guided parallel with the axis of the screw by teeth added on the nut and engaging teeth of the rollers. Such a mechanism is called a planetary roller screw.

With the current design of roller screw mechanisms, the teeth of the rollers and of the nut have, in cross section, an involute profile.

Furthermore, the teeth are threaded during the threading step of the rollers. During the meshing of the teeth of the rollers with the teeth of the nut, the pressure is increased at the top of the teeth due to thread on the teeth of the rollers. This increases the wear of the nut, which has to be replaced.

One solution to solve this problem is to increase the hardness of the nut. However, boring holes in the nut will become very difficult.

The aim of the present invention is to overcome these disadvantages.

More particularly, the aim of the present invention is to provide a roller screw mechanism wherein, for a given diameter, the load capacity is increased.

SUMMARY OF THE INVENTION

In one embodiment, a roller screw mechanism provided with a screw comprises an external thread, a nut surrounding and coaxial with the screw, the nut comprising an internal thread, two gear wheels mounted in a non-threaded part of the nut, each gear wheel comprising a first set of teeth having a plurality of internal, and a plurality of rollers radially located between the screw and the nut. Each roller comprises an external thread designed to engage the external and internal threads of the screw and the nut, and axially at each end a first set of teeth having a plurality of gear teeth designed to engage with the internal gear teeth of the gear wheels.

The outer diameter of the gear teeth of each roller is less or equal to the diameter of the thread root of the external thread of the roller.

Thanks to the diameter difference, the teeth of the rollers are not threaded during the threading step of the rollers. During the meshing of the teeth of the rollers with the teeth of the wheel, the contact pressure exerted by the flanks of the teeth of each roller on the flanks of the corresponding wheel is distributed over a larger surface. The wear of the wheels is thus significantly reduced.

In an embodiment, each roller comprises a second set of teeth having a plurality of gear teeth superposed on the first set of teeth so that the teeth of the second set of teeth are located between the teeth of the first set of teeth and each gear wheels comprises a second set of teeth having a plurality of gear teeth superposed on the first set of teeth so that the teeth of the second set of teeth are located between the teeth of the first set of teeth.

Advantageously, each tooth of each roller has, in cross section, a concave profile curve and each tooth of each gear wheel has, in cross section, a convex profile curve, defined by a circular arc, which approximate a hypocycloid curve.

An "hypocycloid" is the curve traced by a point on the circumference of a smaller circler rotating inside the circumference of a larger fixed circle.

The portion of each concave tooth of each roller in contact with a convex tooth of the associated gear wheel can have, in cross section, a hypocycloid profile.

Providing convex-concave tooth profile enables the contact surfaces of the rollers on the gear wheels to be increased, compared with a conventional rollers with teeth having, in cross section, an involve profile.

The addendum of each tooth of each roller may be reduced to zero.

In an embodiment, each roller comprises, at each end, a cylindrical stud axially extending from the teeth of the roller and designed to be fitted inside cylindrical through-out recesses provided on an annular spacer ring mounted radially between the thread of the screw and the associated wheel.

The hardness of the wheels can be substantially similar to the hardness of the rollers. The wheels can be made, for example, in aluminium, in order to reduce more the wear of the gear wheels.

The invention also relates to an actuator including a rotating means and a roller screw mechanism as defined above, the screw of the mechanism being coupled with the rotating means.

BRIEF DESCRIPTION OF THE DRAWINGS

The present invention will be better understood upon studying the detailed description of embodiments given by way of example, which are in no way limiting and are illustrated by the appended drawings, wherein.

DETAILED DESCRIPTION OF THE INVENTION

Figure 1:
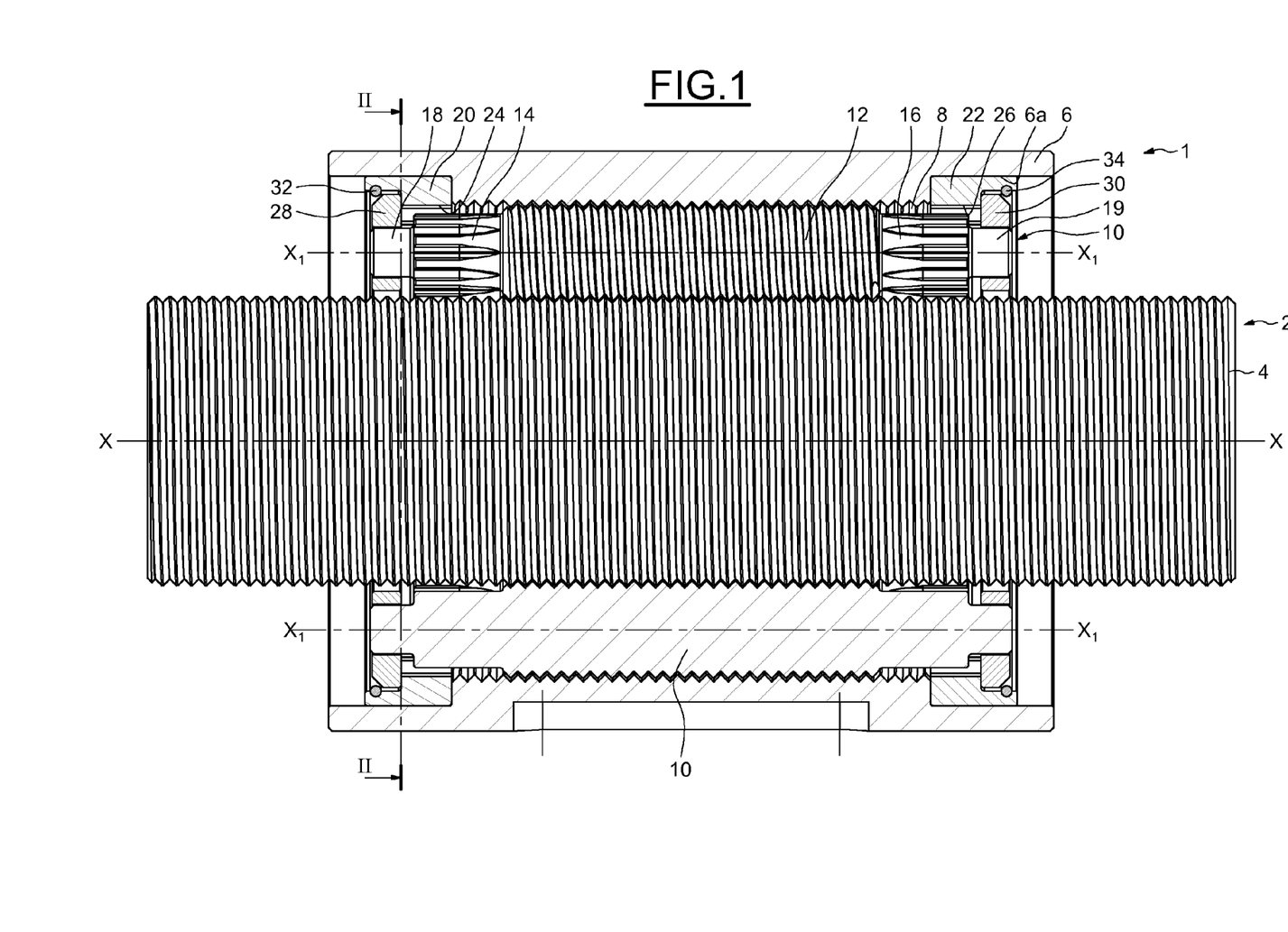
FIG. 1 is a cross-section of a roller screw mechanism according to a first embodiment of the invention.
Figure 2:
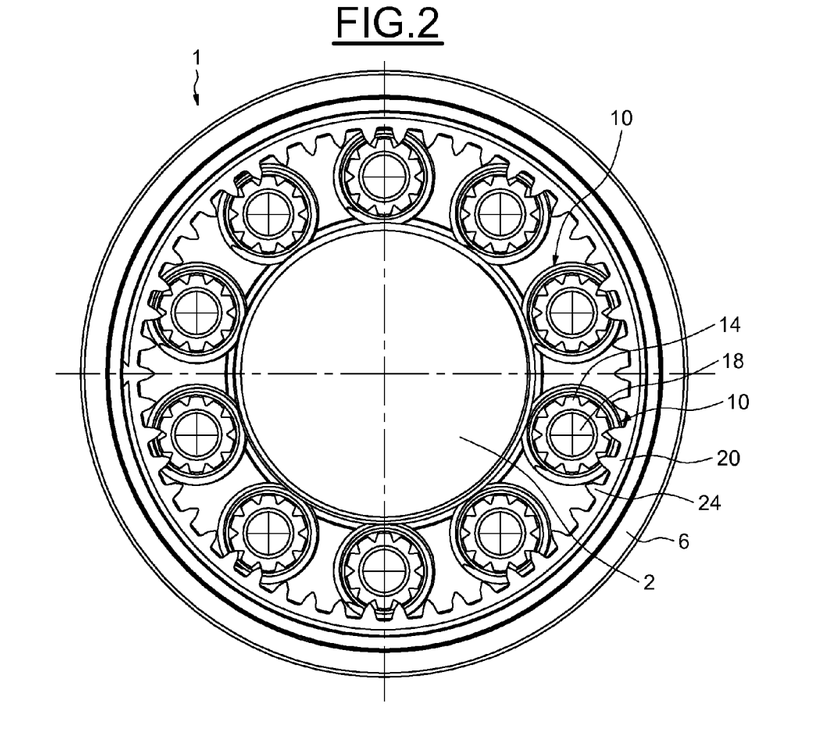
FIG. 2 is an axial section, along line II-II of FIG. 1.
Figure 2A:
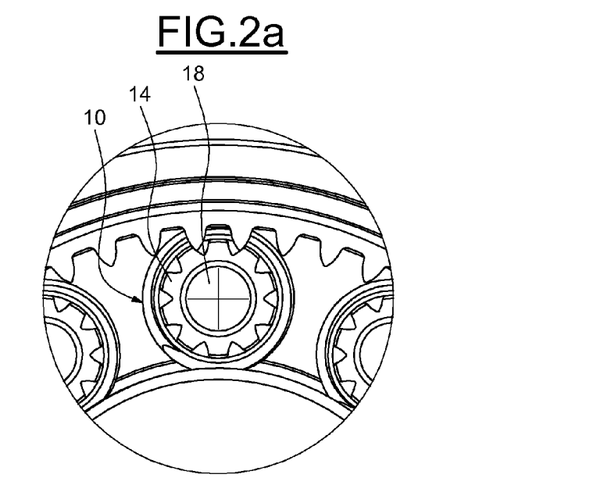
FIG. 2*a* is detail view of FIG. 2.

In FIGS. 1 and 2, a roller screw mechanism, which is referenced 1 as a whole, comprises a screw 2, with an axis X-X, provided with an external thread 4, a nut 6 mounted coaxially about the screw 2 and provided with an internal thread 8, the internal diameter of which is greater than the external diameter of the external thread 4, and a plurality of longitudinal rollers 10 arranged radially between the screw 2 and the nut 6. The screw 2 extends longitudinally through a cylindrical bore of the nut 6 on which the internal thread 8 is formed.

Figure 3:
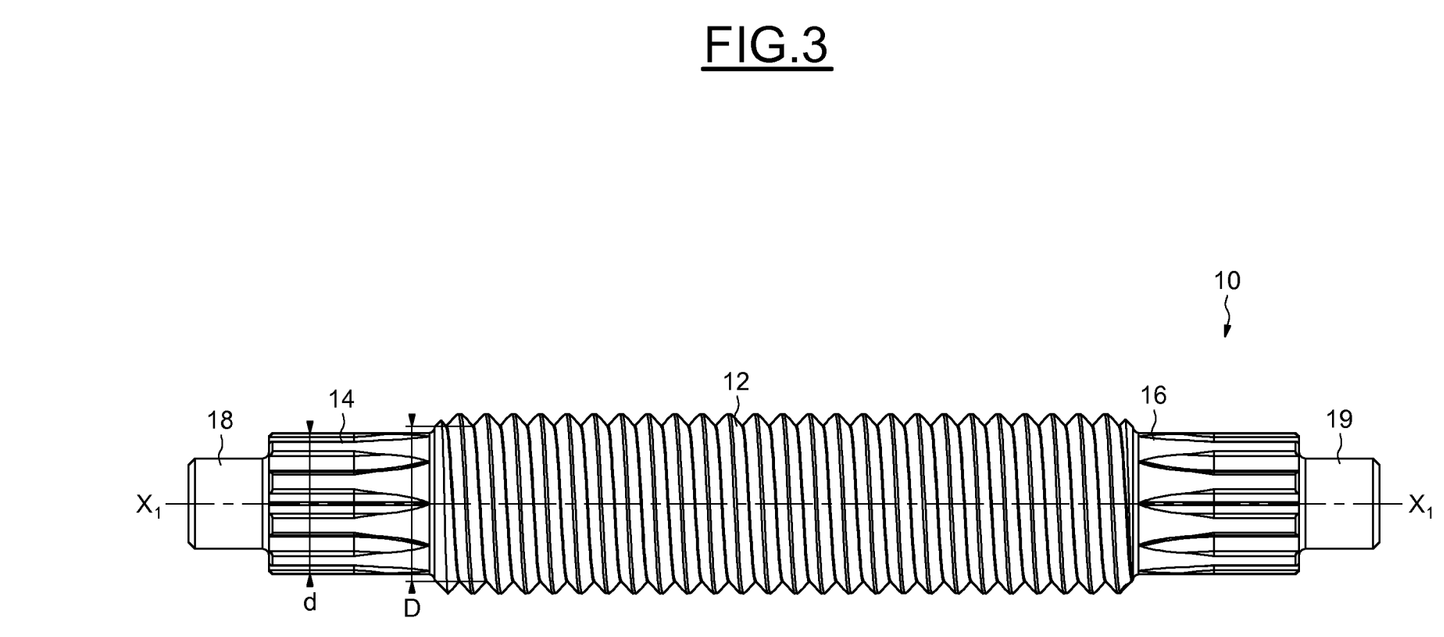
FIG. 3 is a view of a roller of the mechanism of FIG. 1.
Figure 4:
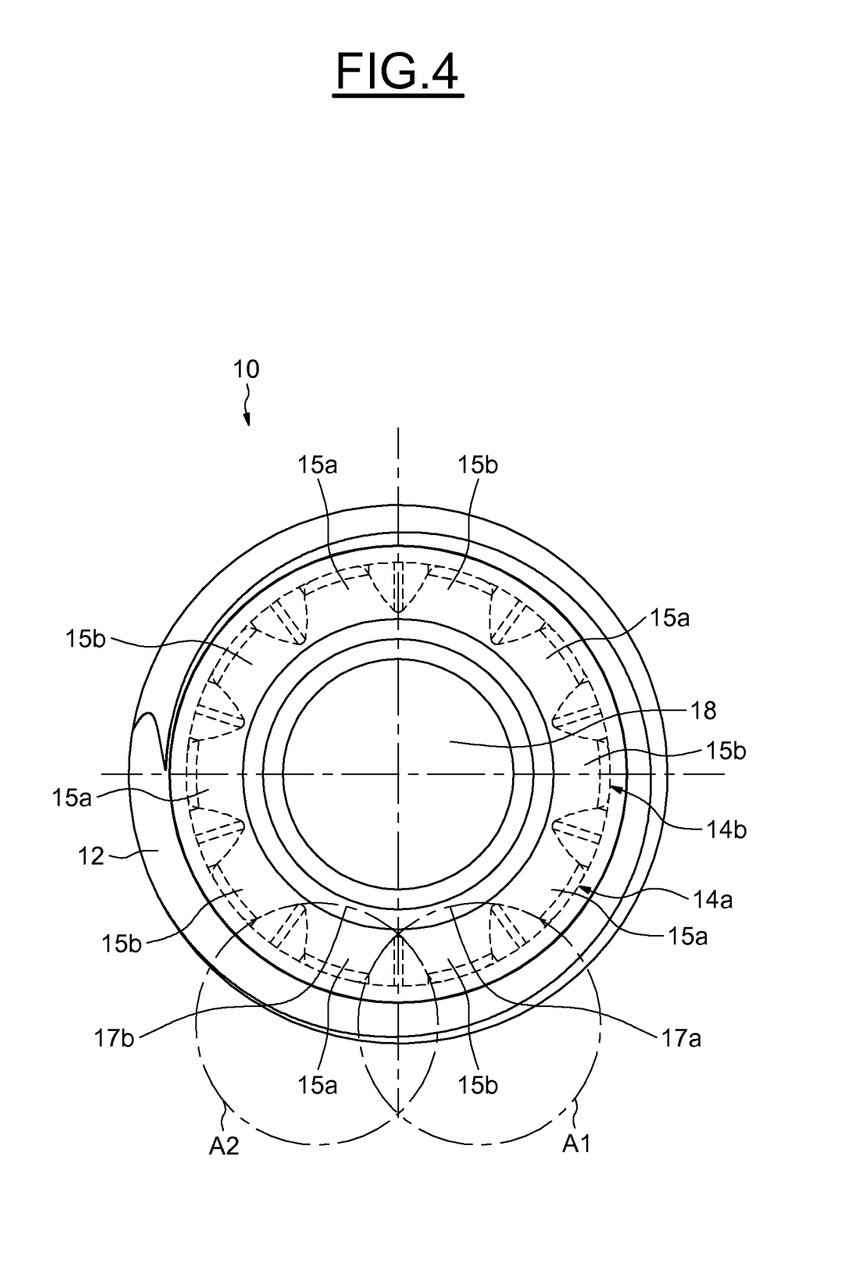
FIG. 4 is a front view of FIG. 3.

The rollers 10, illustrated in detail in FIGS. 3 and 4, are identical to each other and are distributed regularly around the screw 2. Each roller 10 extends along an axis X1-X1 which is coaxial with the axis X-X of the screw 2 and comprises an external thread 12 engaging the thread 4 of the screw 2 and the thread 8 of the nut 6. The thread 12 of each roller 10 is extended axially at each end by a plurality of teeth 14, 16 themselves extended axially by a cylindrical stud 18, 19 extending outwards.

Figure 5:
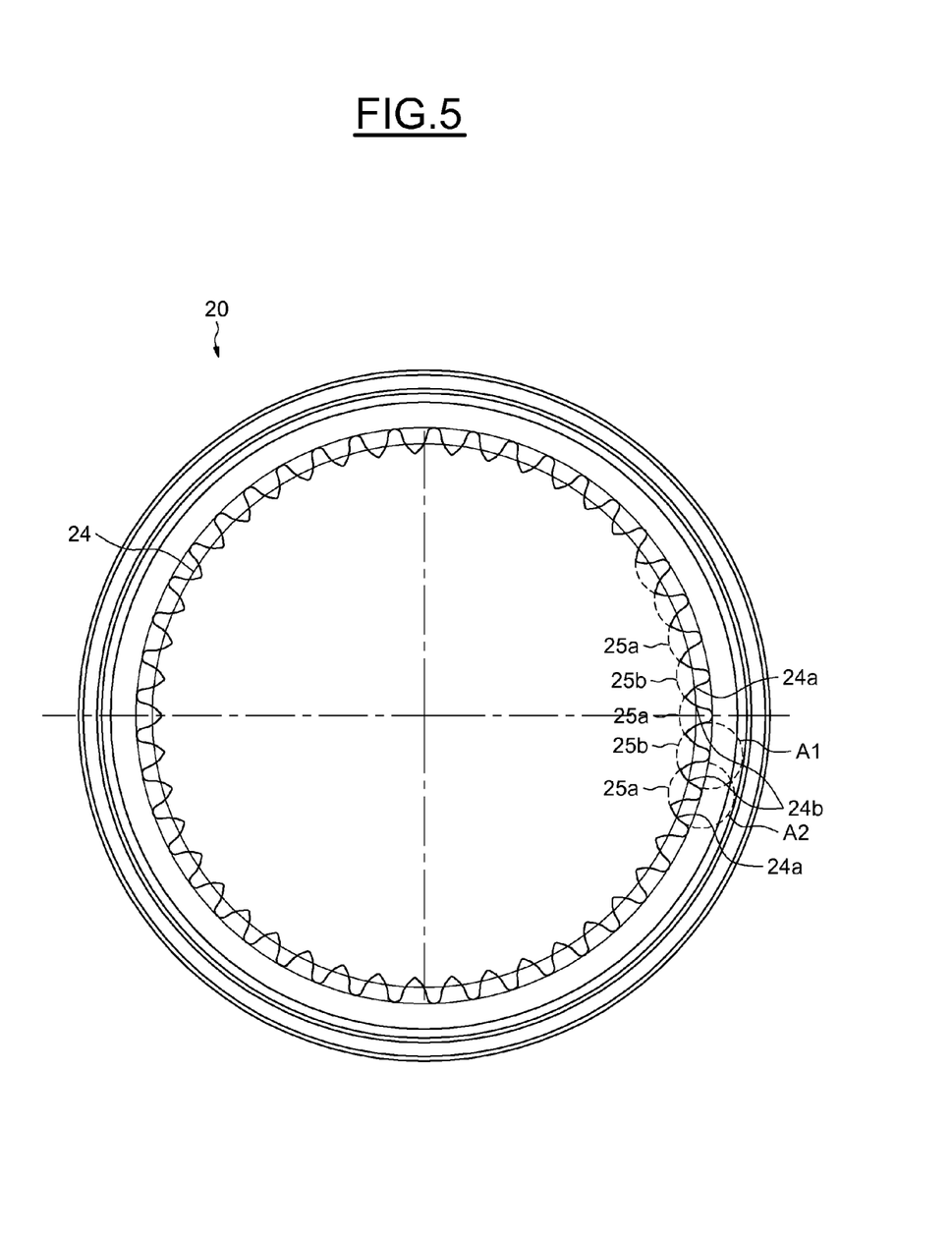
FIG. 5 is a view a gear wheel of the mechanism of FIG. 1.

The mechanism 1 comprises two annular gear wheels 20, 22, illustrated in detail in FIG. 5, fixed in a non-threaded part of the bore 6a of the nut 6 and each comprising internal teeth 24, 26 engaging the teeth 14, 16 respectively of the rollers 10 for the synchronization thereof. The mechanism 1 also includes two annular spacer rings 28, 30 each mounted radially between the thread 4 of the screw 2 and the associated gear wheel 20, 22 and including a plurality of cylindrical through-recesses (not referenced) which are distributed regularly in the circumferential direction and inside which the studs 18, 19 of the rollers 10 are housed. The spacer rings 28, 30 enable the rollers 10 to be carried and the regular circumferential spacing thereof to be kept.

The mechanism 1 further includes retainer rings 32, 34 each mounted in a groove provided in the bore of the associated gear wheel 20, 22 and provided in order to axially hold the corresponding spacer 28, 30.

As an example, the threads 12 of the rollers 10 and the thread 8 of the nut 6 have helix angles that are identical to each other and different to that of the thread 4 of the screw 2 such that, when the screw 2 rotates in relation to the nut 6, the rollers 10 rotate on themselves and roll about the screw 2 without moving axially inside the nut 6. The rollers 10 are rotationally guided parallel with the axis X1-X1 by the teeth 24, 26 of the gear wheels 20, 22. The screw 2 is axially or longitudinally moveable in relation to the rollers 10.

As illustrated on FIG. 3, the outer diameter d of the teeth 14, 16 of each roller 10 is less or equal to the diameter D of the thread root of the external thread 12 of the roller 10. The teeth 14, 16 of each roller 10 are thus not provided with an external thread, which reduces the pressure applied to the teeth 24, 26 of the gear wheels 20, 22.

As illustrated in FIG. 4, each rollers 10 comprises a first set of teeth 14a having a plurality of gear teeth 15a and a second set of teeth 14b having a plurality of gear teeth 15b superposed on the first set of teeth 14a so that the teeth 15b of the second set of teeth 14b are located between the teeth 15a of the first set of teeth 14a.

Each tooth 15a, 15b of each roller 10 has, in cross section, a concave profile curve defined by a circular arc of first and second circles A1, A2.

The spaces 17a respectively between two adjacent teeth 15a of the first set of teeth 14a have a concave profile formed by a circular arc of a circle A1. The spaces 17b respectively between two adjacent teeth 15b of the second set of teeth 14b have a concave profile formed
by a circular arc of a circle A2. The circles A1 and A2 have the same diameter.

Superimposing the first set of teeth 14a with the second set of teeth 14b generates the gear 14 of the rollers 10.

The number of teeth 15a the first set of teeth 14a of each roller 10 is equal to the number of teeth 15b of the second set of teeth 14b. A number of five teeth 15a of the first set of teeth 14a and a number of five teeth 15b of the second set of teeth 15b are illustrated on FIG. 4. The total number of teeth 14 of each roller 10 is thus of ten. As an alternative, the total number of teeth 14 of each roller 10 could be higher than ten, for example twelve.

Figure 4A:
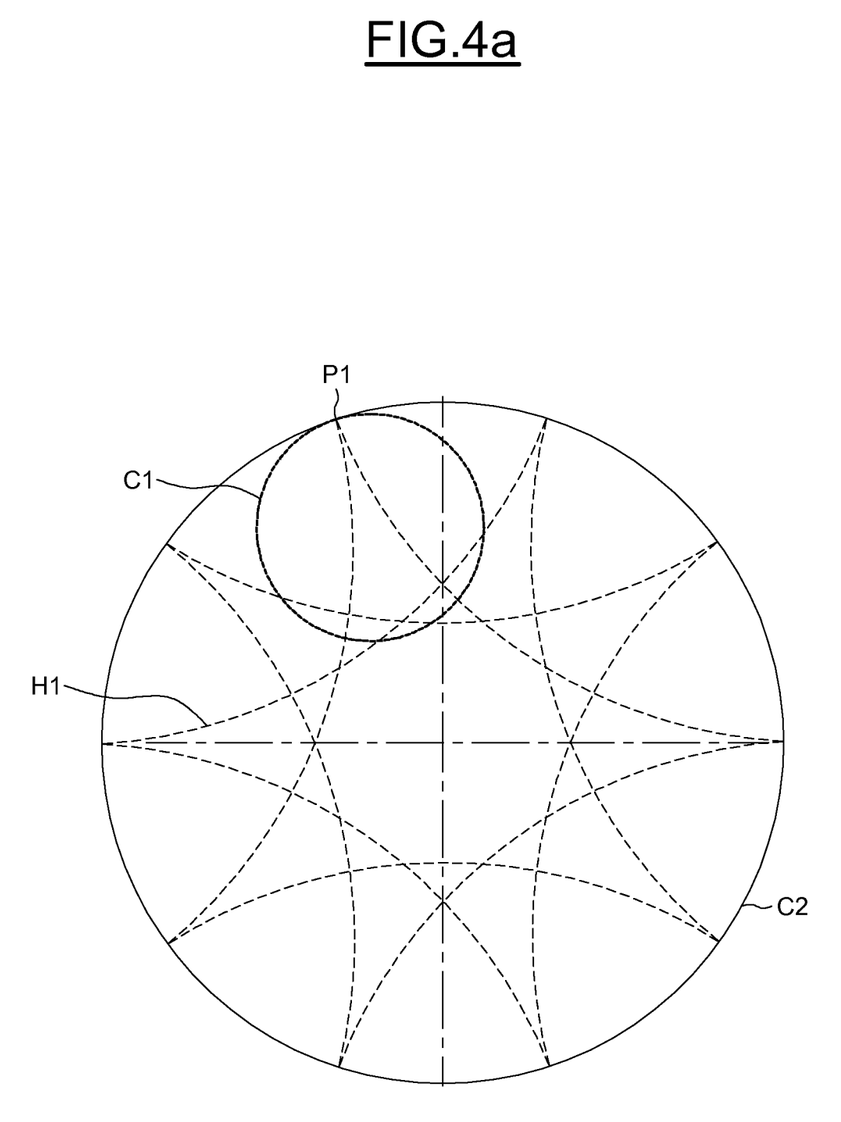
FIG. 4*a* illustrates schematically the generation of a hypocycloid curve.

The circular arcs defining the tooth profile approximate a hypocycloid curve H1 illustrated in dot lines on FIG. 4a.

A hypocycloid is defined in FIG. 4a as follows: a first circle C1 is tangent to a second circle C2 of larger diameter in a point P1 on the circle C1. The path of the point P1, when the circle C1 rolls inside the circle C2 without slipping, generates a hypocycloid curve H1 represented in dot lines on FIG. 4a.

The hypocycloid H1 can be defined by the equation:

$$\begin{cases} x(\theta) = (R-r)\cos(\theta) + r\sin\left(\frac{R-r}{r}\theta\right) \\ y(\theta) = (R-r)\sin(\theta) - r\cos\left(\frac{R-r}{r}\theta\right) \end{cases} \quad (Eq.1)$$

With $x(\theta)$, $y(\theta)$) the coordinates of a point M of the hypocycloidal curve H1, the coordinates being based on an angular parameter $\theta$ such as $\theta \in [\theta_{min}, \theta_{max}]$:

r, the radius of the circle C1 that rolls beneath the larger circle C2

R, the radius of the larger circle C2

The radius r is defined accordingly to the number of teeth.

The value of $\theta_{min}$ and $\theta_{max}$ can be easily calculated since the top and the root radii of the gear are known.

Applying equation (Eq. 1) to the gear teeth 14, 16 of the roller 10 or to the gear wheel 20, 22, R is the radius of the pitch circle of the
roller 10 or the nut 6. The radius or the rolling circle that generates the profile (hypocycloid) is given by the equation:

$$r \cdot N - 2 \cdot R = 0 \quad (Eq. 2)$$

Where N is the number of teeth of the gear.

The previous equation 1 (Eq. 1) that references the profile of either the spur gear 14, 16 of the roller 10 or the wheel gear 20, 22 can be rewritten is the following form (Eq. 3) by substituting the radius R.

$$\begin{cases} x(\theta) = r(N-1)\cos(\theta) + r\sin[r(N-1)\theta] \\ y(\theta) = r(N-1)\sin(\theta) - r\cos[r(N-1)\theta] \end{cases} \quad (Eq.3)$$

When designing the ending epicyclic gears, the following relation equation 4 has to be satisfied:

$$\frac{N_2}{N_1} = \frac{R_{sn}}{R_r} = n \quad (Eq.4)$$

With:

n, the number of starts of the screw 2 or the nut 6,
$N_1$, the number of the spur gear 14, 16 of the roller 10;
$N_2$, the number of the teeth 24, 26, of the wheel gear 20, 22;
$R_{sn}$, the pitch radius of the internal thread of the nut 6;
$R_r$, the pitch radius of the external thread of the roller 10.

Thanks to the tooth profile of the rollers 10, the addendum of each tooth of each roller 10 may be equal to zero. The addendum is defined as the height by which a tooth of a gear projects beyond the pitch circle.

The dedendum of the tooth profile of the rollers 10 is comprised between 0.65 and 1. The dedendum is defined as the height of a tooth between the pitch circle and the root circle.

Only one of the annular gear wheels 20 is illustrated in detail in FIG. 5.

As illustrated in FIG. 5, the gear wheel 20 comprises a first set of teeth 24a having a plurality of gear teeth 25a and a second set of teeth 24b having a plurality of gear teeth 25b superposed on the first set of teeth 24a so that the teeth 25b of the second set of teeth 24b are located between the teeth 25a of the first set of teeth 24a. The teeth 25a, 25b are shown in dot lines on a part of FIG. 5

Each tooth 25a of the first set of teeth 24a has a convex profile formed by a circular arc of a circle A1. Each tooth 25b of the second set of teeth 24b has a convex profile formed by a circular arc of a circle A2. The circles A1 and A2 have the same diameter.

Superimposing the first set of teeth 24a with the second set of teeth 24b generates the gear 24 of the wheel 20.

The circular arcs defining the tooth profile approximate a hypocycloid curve as explained above.

Thanks to the particular profile of the teeth 14, 24 respectively of the rollers 10 and of the wheels 20, 22, the meshing of the teeth 14 of the roller 10 with the teeth 24 of the wheel 20 is conjugated and the contact portion between the associated teeth 14, 24, defined by an hypocycloid, is increased, which decreases the wear of the teeth 14, 24 of the rollers 10 and the wheels 20, 22.

Figure 6:
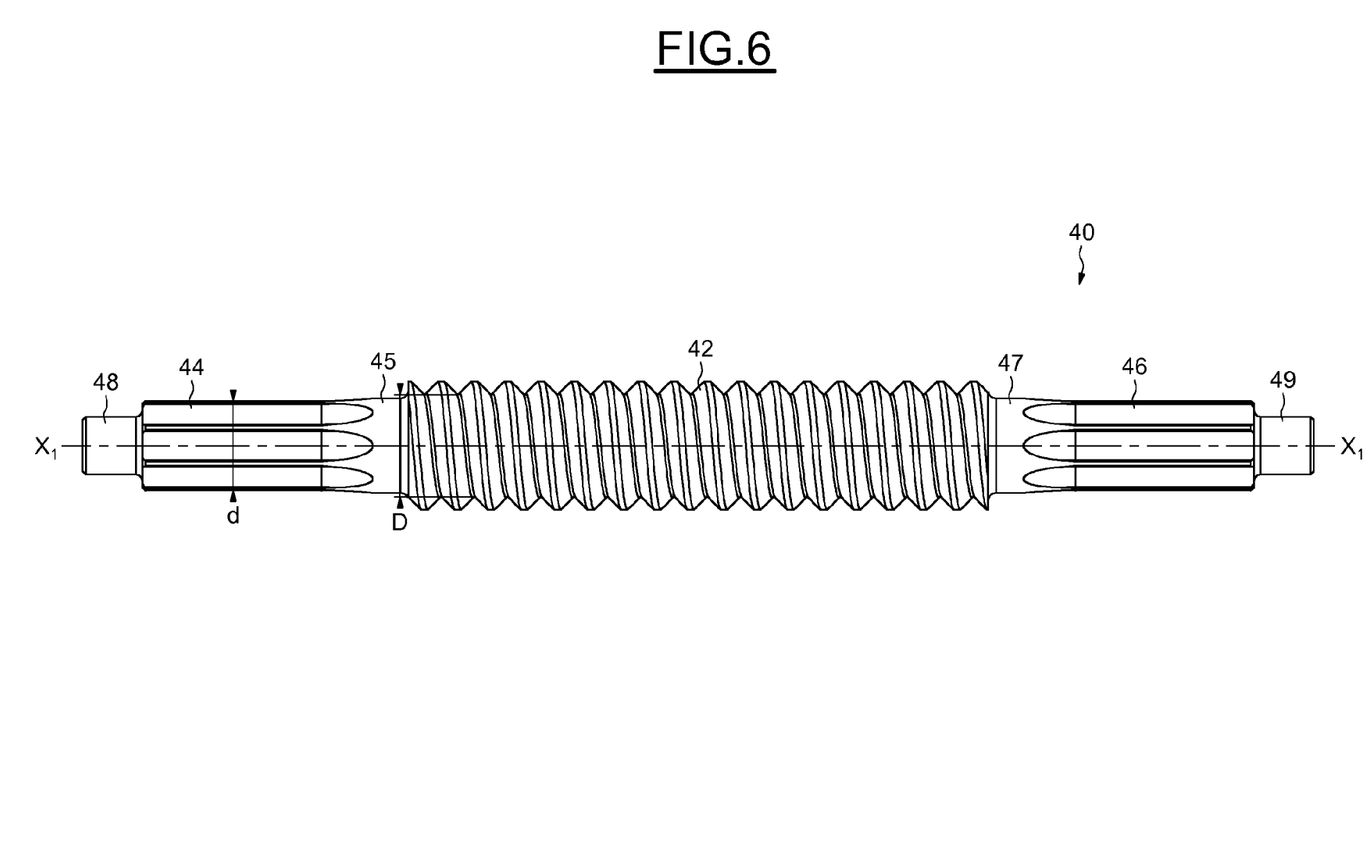
FIG. 6 is a view of the a roller according to a second embodiment.
Figure 7:
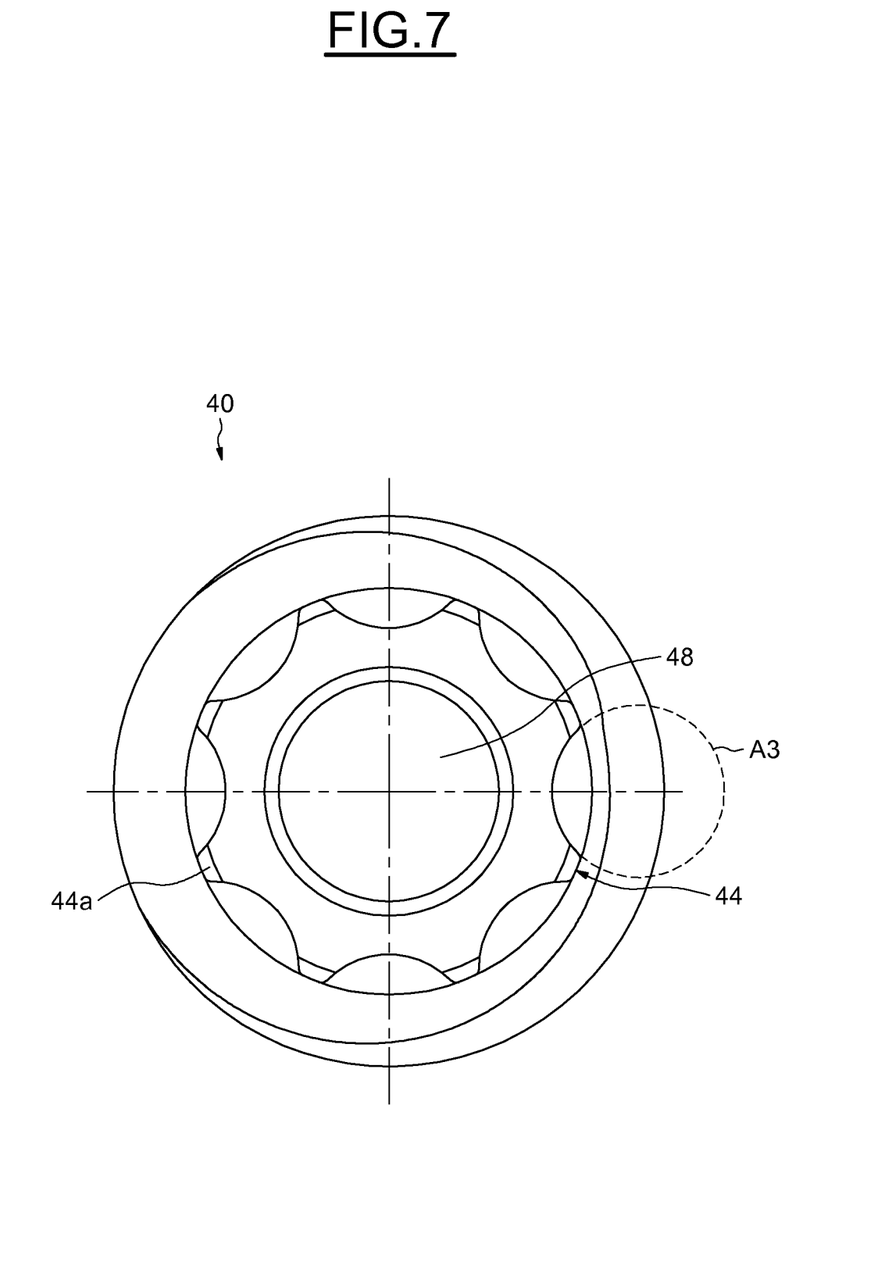
FIG. 7 is a front view of FIG. 6.
Figure 8:
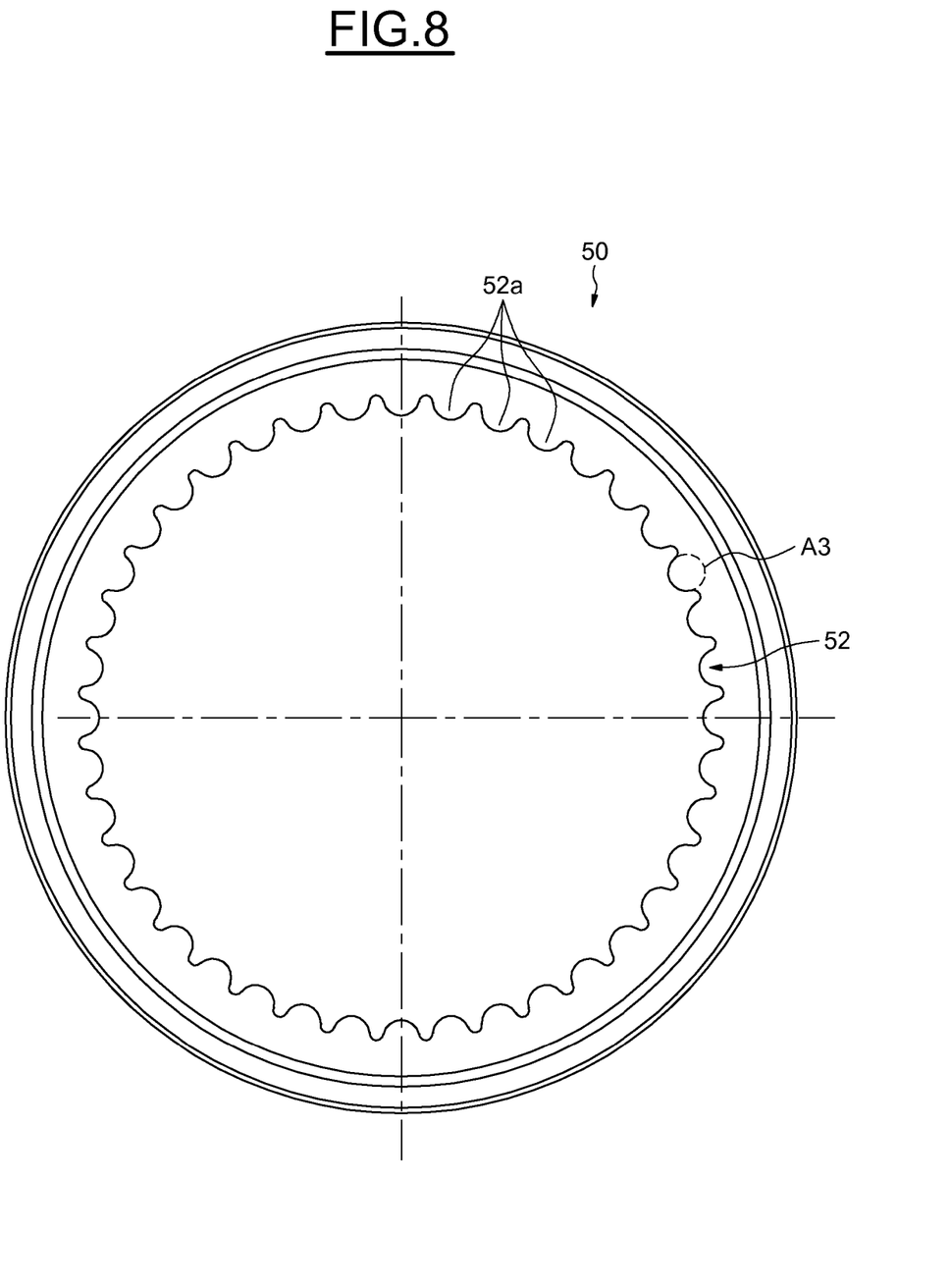
FIG. 8 is a view a gear wheel according to a second embodiment.

In the alternative embodiment illustrated in FIGS. 6 to 8 wherein the same elements have the same references, longitudinal rollers 40 and a gear wheel 50 are designed to be assembled in a the roller screw mechanism of FIG. 1.

The rollers 40, illustrated in detail in FIGS. 6 and 7, are identical to each other and are distributed regularly around the screw 2. Each roller 40 extends along an axis $X_1$-$X_1$ which is coaxial with the axis X-X of the screw 2 and comprises an external thread 42 engaging the thread 4 of the screw 2 and the thread 8 of the nut 6. The thread 42 of each roller 40 is extended axially at each end by teeth 44, 46 themselves extended axially by a cylindrical stud 48, 49 extending outwards. A space portion 45, 47 is provided axially between the external thread 42 and each teeth 44, 46. As an alternative, no space portion could be provided.

As illustrated on FIG. 6, the outer diameter d of the teeth 44, 46 of each roller 40 is less or equal to the diameter D of the thread root of the external thread 42 of the roller 40. The teeth 44, 46 of each roller 40 are thus not provided with an external thread, which reduces the pressure applied to the teeth 52 of the gear wheel 50 illustrated on FIG. 8.

As illustrated in FIG. 7, each roller 10 comprises one set of teeth 44 having a plurality of gear teeth 44a. Each tooth 44a of each roller 40 has, in cross section, a concave profile curve defined by a circular arc of a circle A3.

The number of teeth 44a in this example is equal to eight. As an alternative, the number of teeth 44a of each roller 10 could be higher than eight.

The circular arcs defining the tooth profile approximate a hypocycloid curve (not shown). As explained above, the hypocycloid is defined by the path of the point of a first circle, tangent to a second circle of larger diameter, when the smaller circle rolls inside the bigger circle without slipping.

Only one of the annular gear wheels 50 is illustrated in detail in FIG. 8. Each annular gear wheel 50 is designed to be fixed in a non-threaded part of the bore 6a of the nut 6 and comprises internal teeth 52 engaging the teeth 44, 46 respectively of the rollers 40 for the synchronization thereof.

As illustrated in FIG. 8, the gear wheel 50 comprises one set of teeth 52 having a plurality of gear teeth 52a having each, in cross section, a convex profile curve defined by circular arc of a circle A3. The circular arcs defining the tooth profile approximate a hypocycloid curve (not shown).

The hardness of the wheels is substantially similar to the hardness of the rollers. For example, the wheels are made in aluminium.

The use of this convex-concave tooth profile makes possible to design for the roller a spur gear which outer diameter is lower than the root diameter of the thread regardless of the pitch of the roller. This cannot be achieved for high pitch with an involute gear. For that reason, the interference between the thread and the tooth of the spur gears at each end of the roller can be avoided.

Furthermore, the width of the tooth is thus uniform from the root diameter to the outer diameter of the spur gear of the roller, which cannot be achieved with known involute tooth profile. Providing convex-concave tooth profile thus enables the contact surfaces of the rollers on the gear wheels to be increased, compared with a conventional rollers with teeth having, in cross section, an involve profile. The load is axially distributed over a larger surface than before.

The use of this profile reduces the pressure on both spur gear of the roller and wheel gear due to the geometry of the contacting surfaces. In fact, the mating surfaces of the gears are conforming contacts as they are made of concave-convex tooth profiles in cross section, i.e. concave for the spur gear and convex for the wheel gear. Owing to the axial load distribution and the reduction of the amount the maximum pressure, the contacts of the gearing are mostly rolling with very low wear which results in a longer life comparatively to an involute profile.

Thanks to the invention, the gear is able to resist more to binding and pressure, with the same number of tooth and larger face width of teeth compared to a gear with involute tooth profile.

Also, the use of the hypocycloidal profile provides much facility to the manufacturing process of the roller as it allow reducing the roller thread length only to its useful length.

Indeed, the manufacturing of the thread can be rolled or even realized directly on a heat treated material, facts that were not possible with the known involute gearing.

In operation, during the transmission of the forces, the contact pressure exerted by the flanks of the teeth of each roller on the flanks of the corresponding wheel is thus distributed over a larger surface. The stiffness is thus increased due to the decrease in the width of each tooth.

Thanks to the tooth profile of the rollers and of the wheels, the load capacity of the roller screw mechanism is increased and the wear of the wheels is reduced. Indeed, the teeth of the rollers do not have to be threaded during the threaded operation of the external thread of the rollers.

The invention claimed is:

1. A roller screw mechanism provided with a screw comprising:
an external thread,
a nut surrounding and coaxial with the screw, the nut having an internal thread, two gear wheels mounted in a non-threaded part of the nut, each gear wheel including a first set of teeth having a plurality of internal teeth, and a plurality of rollers radially located between the screw and the nut, each of the plurality of rollers providing a roller external thread designed to engage the external and internal threads of the screw and the nut, respectively, and axially at each end a first set of roller teeth having a plurality of gear teeth designed to engage with the plurality of internal teeth of the gear wheels, wherein an outer diameter of the first set of roller teeth of each of the plurality of rollers is less or equal to a diameter of a thread root of the roller external thread of the plurality of rollers, wherein the addendum of each tooth of the plurality of gear teeth of each of the plurality of rollers is equal to zero.

2. The roller screw mechanism according to claim 1, wherein each roller further comprises, at each end, a cylindrical stud axially extending from the plurality of gear teeth of the roller, and designed to be fitted inside cylindrical throughout recesses provided on an annular spacer ring mounted radially between the external thread of the screw and the associated gear wheel.

3. The roller screw mechanism according to claim 1, wherein the hardness of the gear wheels is substantially similar to the hardness of the rollers.

4. A roller screw mechanism provided with a screw comprising:
an external thread,
a nut surrounding and coaxial with the screw, the nut having an internal thread, two gear wheels mounted in a non-threaded part of the nut, each gear wheel including a first set of teeth having a plurality of internal teeth, and
a plurality of rollers radially located between the screw and the nut, each of the plurality of rollers providing a roller external thread designed to engage the external and internal threads of the screw and the nut, respectively, and axially at each end a first set of roller teeth having a plurality of gear teeth designed to engage with the plurality of internal teeth of the gear wheels, wherein an outer diameter of the first set of roller teeth of each of the plurality of rollers is less or equal to a diameter of a thread root of the roller external thread of the plurality of rollers, and wherein each of the plurality of gear teeth of each roller has, in cross section, a concave profile curve and each of the plurality of internal teeth of each gear wheel has, in cross section, a convex profile curve.

5. The roller screw mechanism according to claim 4, wherein a tooth profile curve of the gear wheels and the plurality of rollers is defined by a circular arc.

6. The roller screw mechanism according to claim 4, wherein a tooth profile curve of the gear wheels and the plurality of rollers is defined by a hypocycloid curve.

7. The roller screw mechanism according to claim 6, wherein a portion of each concave tooth of each roller in contact with a convex tooth of the associated gear wheel has, in cross section, a hypocycloid profile.

* * * * *